United States Patent
Di Maio et al.

(10) Patent No.: US 6,388,255 B1
(45) Date of Patent: May 14, 2002

(54) TEMPERATURE SENSOR AND SENSING APPARATUS

(75) Inventors: Marco Di Maio, Duisburg (DE); Roger Reichle, Provence (FR)

(73) Assignee: European Atomic Energy Community (EURATOM), Plateau de Kirchberg (LU)

(*) Notice: Subject to any disclaimer, the term of this patent is extended or adjusted under 35 U.S.C. 154(b) by 0 days.

(21) Appl. No.: 09/297,689

(22) PCT Filed: Nov. 6, 1997

(86) PCT No.: PCT/GB97/03052

§ 371 Date: Sep. 10, 1999

§ 102(e) Date: Sep. 10, 1999

(87) PCT Pub. No.: WO98/20316

PCT Pub. Date: May 14, 1998

(30) Foreign Application Priority Data

Nov. 6, 1996 (GB) ............................................. 9623139

(51) Int. Cl.$^7$ ................................................. G01K 7/34
(52) U.S. Cl. ................................. 250/338.2; 250/338.1
(58) Field of Search ........................... 250/338.2, 338.1, 250/338.4; 340/870.16

(56) References Cited

U.S. PATENT DOCUMENTS

| | | |
|---|---|---|
| 3,260,116 A | 7/1966 | Grady, Jr. |
| 3,676,754 A | 7/1972 | Maserjian et al. |
| 4,025,912 A | 5/1977 | Rice |
| 4,902,895 A | 2/1990 | Hanson |
| 5,041,800 A * | 8/1991 | Long et al. ..................... 331/69 |
| 6,111,520 A * | 8/2000 | Allen et al. ............. 340/870.16 |

FOREIGN PATENT DOCUMENTS

| | | |
|---|---|---|
| EP | 0753726 | 1/1997 |
| EP | 0753726 A1 | 1/1997 |
| GB | 613116 | 11/1948 |
| GB | 998534 | 7/1965 |
| GB | 1043582 | 9/1966 |
| GB | 1108684 | 4/1968 |
| GB | 2039054 A | 7/1980 |
| GB | 2039054 | 7/1980 |
| GB | 0310101 A2 | 4/1989 |

OTHER PUBLICATIONS

"Pyroelectric Infrared Sensor Using PZT Thin Plate on Diaphragm as Sensitive Elements," Yoshiharu Taniguchi et al., Electronics and Communications in Japan, Part 2, vol. 79, No. 7, 1996, pp. 86–96.

"Dynamicm Measurement of the Temperature Characteristic of Dielectric Material for Microwave Application Using Photo Thermal Dielectric Microscope," Yasuo Cho et al., IEEE MTT–S International Microwave Symposium Digest, Orlando, May 16–20, 1995, vol. 3, pp. 1483–1486.

Taniguchi Y et al, Electronics & Communications in Japan, Part II–Electronics, vol. 79, No. 7, Jul. 1996, pp. 86–96.

Yasuo Cho et al, IEEE MTT–S International Microwave Synposium Digest, Orlando, May 16–20, 1995, vol. 3. May 1995. Kirby L, pp. 1483–1476.

* cited by examiner

*Primary Examiner*—Seungsook Ham
*Assistant Examiner*—Otilia Gabor

(57) ABSTRACT

A sensing apparatus, a bolometer, and a bolometer sensor includes an inductor and capacitor connected as a resonant circuit. At least one of the capacitor or inductor has a temperature-dependent reactance, and the resonant frequency is dependent on the temperature of inductor or capacitor. The bolometer is suitable for fusion research and its resonant circuit includes a ferroelectric capacitor. The resonant frequency of the circuit may be tracked by means of a phase locked loop.

17 Claims, 7 Drawing Sheets

TEMPERATURE SENSOR AND SENSING APPARATUS

This application is the national phase under 35 U.S.C. §371 of PCT International Application No. PCT/GB97/03052 which has an International filing date of Nov. 6, 1997 which designated the United States of America.

The present invention relates to temperature sensors, sensing apparatus, and in particular, although not exclusively, to temperature sensors used as the radiation detecting elements in bolometers.

Temperature sensors having temperature-dependent properties which can be measured electrically are well known, and include resistors, semiconductor devices such as diodes, and thermocouples. For each of these examples, the temperature of the sensor is typically determined by measuring the magnitude of a voltage across or a current through the sensor. A disadvantage with these sensors is that any noise developed in, or picked up by the sensor or the cables connecting the sensor to electrical measuring apparatus therefore results in noise on the measured temperature.

It is also known to use capacitors as temperature sensors, where temperature changes lead to dimensional changes of the dielectric material separating the capacitor's electrodes, resulting in changes in capacitance which can be measured using a capacitance bridge. However, measurement of this capacitance, and hence the temperature of the sensor, to sufficient accuracy may be hindered by the inherent inductance and capacitance of the cables connecting the sensor to the measuring apparatus. Furthermore, in certain applications, for example where the sensor is located in a harsh environment, it may not be possible to position the measuring apparatus close to the sensor in order to overcome this problem.

Bolometers incorporating temperature sensors are well known devices for measuring radiation, and in these devices the temperature sensors are arranged to have temperatures dependent on the flux of incident radiation.

Different types of bolometer are used for measuring different types of radiation in various environments; in fusion experiments, for example, bolometers are used to measure quantitatively the radiation and neutral particle emission from the plasma.

For such an application, a bolometer should preferably feature high signal to noise ratio and good resolution both in time and radiation flux, and comprise a temperature sensor having high temperature and vacuum compatibility, connected to the rest of the bolometer by a minimum number of cables. Additionally, the bolometer should be insensitive to fusion-specific noise sources, and the temperature sensor should be small in size, resistant to neutron and gamma-irradiation, and be insensitive to the presence of high magnetic fields.

The most commonly used bolometer in fusion research is based on a temperature sensitive thin metal resistor that forms part of a Wheatstone Bridge. Other resistance bolometer designs use semiconductors as their temperature sensors, because of their higher temperature effect. A further, different approach is a pyroelectric bolometer, where the spontaneous polarisation of a pyroelectric crystal is used as the temperature sensitive element.

The above designs have various disadvantages. The common problem of all, however, is that they are measuring absolute voltages or currents produced by the sensitive element, leading to considerable noise pick-up in electrically noisy environments. Future fusion devices will be larger, so that these signals have to be transmitted over longer distances, for example more than 100 m, making them even more susceptible to noise pick-up.

Other disadvantages arise from the neutron environment. The current designs are unlikely to be sufficiently radiation hard in future applications; resistance bolometers employ carrier foils, including mica and kapton, both of which contain hydrogen which may lead to rapid deterioration; semiconductor systems change their properties when irradiated with high neutron fluxes; and the electronics necessary for the pyroelectric bolometers may not be used close to the detector head.

In the field of infra-red detection, a bolometer is known in which a resistor is used as the temperature sensor, where the resistor forms part of an electronic active oscillator circuit. The frequency of oscillation of the circuit is dependent on the resistance of the resistor, which in turn is a function of its temperature. However, such a bolometer is unsuitable for use in fusion research, as the use of a resistive sensor again leads to considerable noise pick-up in a noisy environment, and the electronics necessary for the oscillator circuit may not be positioned in a region of high neutron flux.

Therefore, it is an object of embodiments of the present invention to provide a temperature sensor suitable for use in a noisy environment, and to provide a temperature sensor suitable for use in a bolometer for measuring radiation in fusion research.

It is an object of further embodiments of the present invention to provide sensing apparatus suitable for measuring temperature in a noisy environment.

It is an object of further embodiments of the present invention to provide a bolometer for measuring radiation in a noisy environment.

It is an object of further embodiments of the present invention to provide a bolometer for measuring radiation in fusion research.

It is an object of further embodiments to provide a bolometer sensor suitable for use in a noisy environment, and in particular for use in fusion research.

According to a first aspect of the present invention there is provided sensing apparatus comprising:

a temperature sensor comprising an inductor and a capacitor connected as a resonant circuit, wherein at least one of said capacitor and said inductor has a temperature-dependent reactance, whereby the resonant frequency of said resonant circuit is dependent on the temperature of at least one of said inductor and said capacitor; and means for measuring the resonant frequency of said resonant circuit, wherein said measuring means includes signal generating means responsive to said resonant circuit to generate a signal at the resonant frequency thereof and indicating means to provide an indication of the frequency of the signal generated by said signal generating means, and said measuring means in combination with said resonant circuit comprises a phase-locked loop (PLL) operable to track said resonant frequency.

According to a second aspect of the present invention there is provided sensing apparatus comprising:

a temperature sensor comprising an inductor and a capacitor connected as a resonant circuit, wherein at least one of said capacitor and said inductor has a temperature-dependent reactance, whereby the resonant frequency of said resonant circuit is dependent on the temperature of at least one of said inductor and said capacitor; and means for measuring the resonant frequency of said resonant circuit, wherein said measuring means includes signal generating means operable to generate a signal at a frequency lying within a frequency range and to scan said frequency across said range, said range including said resonant frequency.

According to a third aspect of the present invention there is provided sensing apparatus including:

a plurality of temperature sensors, each temperature sensor comprising an inductor and a capacitor connected as a resonant circuit, wherein at least one of said capacitor and said inductor has a temperature-dependent reactance, whereby the resonant frequency of said resonant circuit is dependent on the temperature of at least one of said inductor and said capacitor, each temperature sensor providing a respective different range of resonant frequencies;

means for measuring the resonant frequency of the resonant circuit of each of said sensors; and a common transmission line, said sensors being connected to said measuring means by said common transmission line.

An advantage of these three aspects of the present invention is that the resonant frequency of the resonant circuit is insensitive to noise, and hence the or each temperature sensor may be used in noisy environments.

A second advantage of these aspects of the present invention is that the resonant frequency of the circuit, being determined by the reactances of the capacitor and inductor, which in turn are determined by local conditions at the sensor, is insensitive to the characteristics of any attached cables, and hence may be measured accurately using measuring means connected to the resonant circuit by long cables.

Advantageously, the capacitor may have a dielectric whose permittivity is temperature-dependent, and this dielectric may be formed from ferroelectric material.

Conveniently, the capacitor may be a thin-film ferroelectric capacitor, formed as an integrated circuit device on a substrate.

Advantageously, the capacitor may be located on a region of the substrate having reduced, or minimal thickness, in order to improve thermal response.

The inductor may comprise a conducting loop, which may be formed for example as a planar thin film.

Advantageously, the sensing apparatus may be incorporated in a bolometer, and the capacitor may be arranged to have a temperature dependent on the flux of radiation incident on the sensor. Conveniently, the bolometer may be used in fusion research.

According to a fourth aspect of the present invention there is provided a bolometer sensor comprising:

two temperature sensors, each temperature sensor comprising a respective inductor and a respective capacitor connected as a resonant circuit, wherein at least one of said capacitor and said inductor has a temperature-dependent reactance, whereby the resonant frequency of said resonant circuit is dependent on the temperature of at least one of said inductor and said capacitor; and a shield arranged to shield the temperature dependent inductor or capacitor of one of said sensors from at least a proportion of incident radiation of at least one type.

The two temperature sensors may be nominally identical, and may comprise ferroelectric capacitors formed on a common substrate. The difference between the resonant frequencies of the two circuits may then be used as an accurate indication of the intensity of radiation of the predetermined type incident on the sensor.

According to a fifth aspect of the present invention there is provided a temperature sensor comprising an inductor and a capacitor connected as a resonant circuit, wherein said capacitor is a ferroelectric capacitor formed by integrated circuit techniques on a substrate, whereby the resonant frequency of said resonant circuit is dependent on the temperature of said capacitor.

Embodiments of the present invention will now be described with reference to the accompanying drawings, in which.

Figure 1:
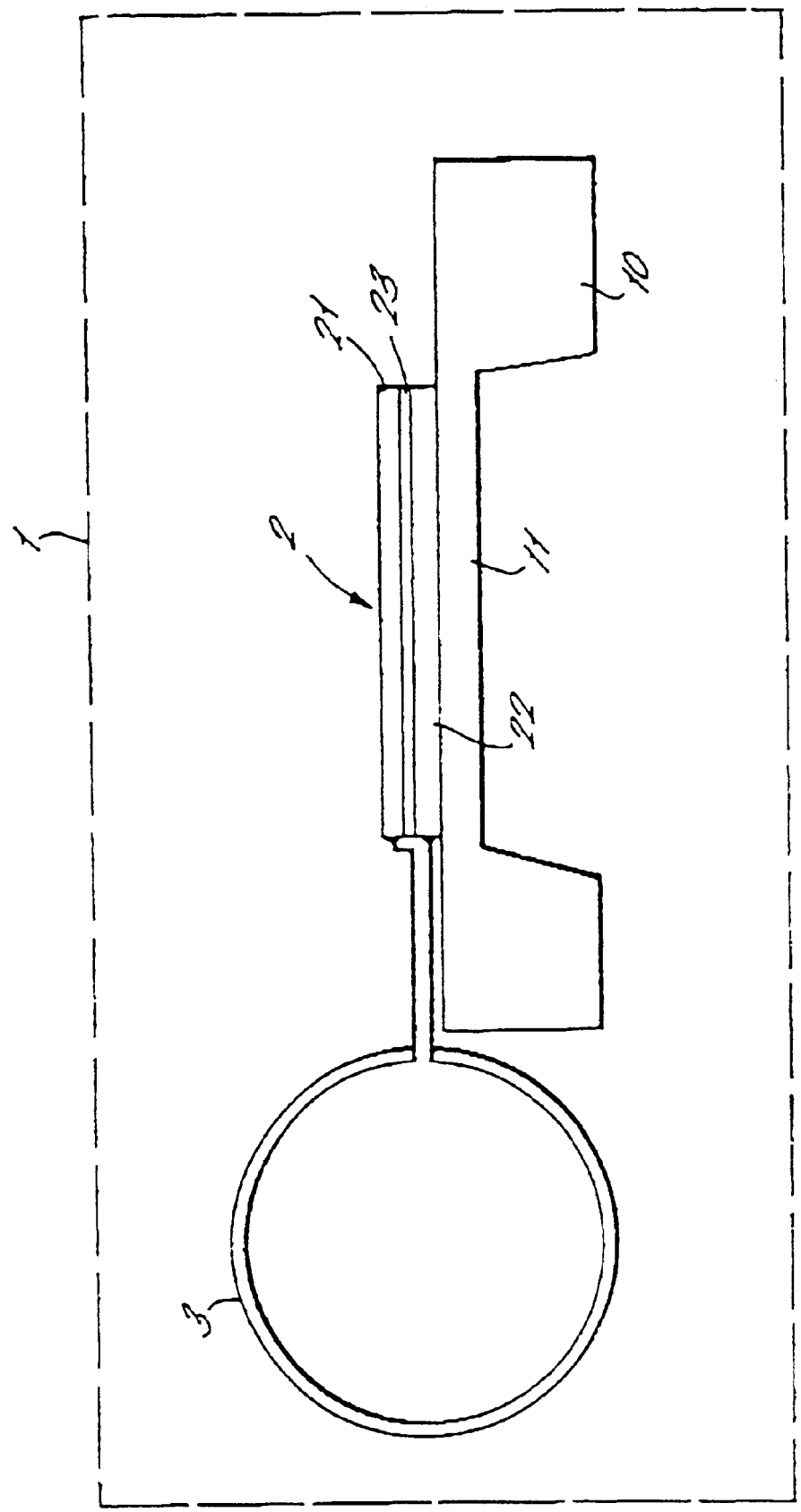
FIG. 1 is a schematic diagram of a temperature sensor in accordance with a first embodiment of the present invention.

In FIG. 1, a temperature sensor 1 is shown, which is suitable for use as a radiation detector in a bolometer. In order to have good thermal and electrical response, the sensor has been designed to have low thermal mass and high electrical quality factor (i.e. very low ohmic resistance, since $Q=(1/R)\sqrt{(L/C)}$) at the intended operating frequencies.

The sensor 1 comprises a thin-film ferroelectric capacitor 2 and an inductor 3 in the form of a single-turn RF coil, having little stray capacitance, bonded to the electrodes 21, 22 of the capacitor 2 to form a parallel LC resonant circuit. The capacitor 2 has been formed by integrated circuit techniques on a substrate 10, and is located on a window 11 defined as a region 11 of reduced thickness produced in the substrate 10 by etching. The substrate should be electrically insulating or the capacitor is isolated from a semiconducting substrate by an insulating layer (not shown in the Figure).

The thicknesses of the window 11, the top and bottom electrodes 21, 22 of the capacitor 2, and the ferroelectric 23 may be of order 5 $\mu$m, 1.5 $\mu$m, 2.5 $\mu$m and 1 $\mu$m respectively. Alternatively, the top and bottom electrodes 21, 22 may be of equal thickness.

It will be apparent that the thickness of components may be chosen to give the desired thermal response. In order to improve the thermal response the window thickness may be reduced still further, and under the capacitor 2 the substrate may in fact be completely etched away.

The substrate 10 in this embodiment is a silicon wafer, although in alternative embodiments other substrate materials may be employed.

The permittivity, $\epsilon$, of the ferroelectric 23 varies rapidly with temperature, especially near its Curie temperature, and hence as its temperature changes, the capacitance of the ferroelectric capacitor changes also.

$$C(T) \sim \epsilon(T),$$

The relative change in capacitance with temperature is equal to the relative change in $\epsilon$:

$$\frac{1}{C}\frac{dC}{dT} \equiv \frac{1}{\epsilon}\frac{d\epsilon}{dT}$$

for which values of more than 1% per degree kelvin have been reported. Since the resonant frequency $f_o$ of the LC resonant circuit depends on C and thus on T, its measurement can be used for temperature measurements:

$$f_o \sim \frac{1}{\sqrt{C(T)}}$$

The relative change of frequency with temperature then is:

$$\frac{1}{f_o}\frac{df_o}{dT} = -\frac{1}{2}\frac{1}{C}\frac{dC}{dT} = -\frac{1}{2}\frac{1}{\epsilon}\frac{d\epsilon}{dT}$$

which is a factor of 2 smaller than for $\epsilon$ (>5.10$e^{-3}K^{-1}$)

When the sensor 1 is used as a radiation detector in a bolometer, radiation incident on the capacitor 2 is absorbed by the two electrodes 21, 22 of the capacitor 2. The capacitor then heats up. The sensor 1 may be arranged such that the temperature of the capacitor 2 is dependent on the flux of radiation incident on the capacitor 2. A measure of the flux of incident radiation can thus be obtained by measuring the resonant frequency of the resonant circuit.

The temperature sensor 1 may be operated at temperature in excess of the Curie temperature of the ferroelectric material 23 incorporated in the capacitor 2. At such temperatures the variation of electric susceptibility $X_e$ with temperature obeys a Curie-Weiss Law of the form:

$$\chi_e = \frac{A}{T-\theta}$$

where A is a constant, T is the absolute temperature, and $\theta$ is the Weiss constant, approximately equal to the Curie temperature of the material. Now:

$\epsilon = \epsilon_r \epsilon_0$ and $\epsilon_r = 1 + X_e$, therefore the Curie-Weiss Law may be used to determine temperature changes of the capacitor 2 from measurements of changes in resonant frequency.

Alternatively, the sensor 1 may be operated at temperatures below the Curie temperature, and at such temperatures further calibration of the sensor 1 may be necessary.

Advantageously, the ferroelectric material may be Lead Zirconium Titanate (PZT) or Lead Lanthanum Zirconium Titanate (PLZT).

Advantages of the first embodiment are:

1) the capacitance of the ferroelectric capacitor has a strong temperature dependence and enables high resolution of temperature changes;
2) the resonant circuit has a high quality factor;
3) the capacitor has a low heat capacity, and so provides the sensor with good thermal response;
4) the resonant frequency of the sensor 1 may be altered by replacing the coil 3 with another coil having a different self inductance. Thus, by employing different coils, sensors having offset resonant frequencies could be produced. These different sensors could be used together in temperature measurement or bolometer systems, connected to resonant frequency measuring means by a common cable or cables, the measuring means being operable to detect the resonances of the individual resonant circuits using signals of different frequencies transmitted on the common cable or cables;
5) the components of the sensor 1 may be compatible with use at very high temperatures. The Curie temperature of the ferroelectric 23 may be in the range 300–400° C. or higher (although in other embodiments the Curie temperature may of course be lower), and the processes involved in producing the sensor may assure high mechanical, chemical and electrical stability at even higher temperatures still;
6) the resonant frequency of the sensor should be insensitive to electrical noise and should not be effected by losses in cables connecting the sensor to remote measuring and monitoring equipment;
7) the ferroelectric 23 may be radiation-hard, enabling the sensor 1 to be used in applications where considerable neutron fluxes are encountered, such as in nuclear reactors; and
8) the resonant frequency of the sensor is insensitive to the presence of high magnetic fields, and the sensor may be used as the radiation detector in a bolometer for use in fusion research.

Figure 2:
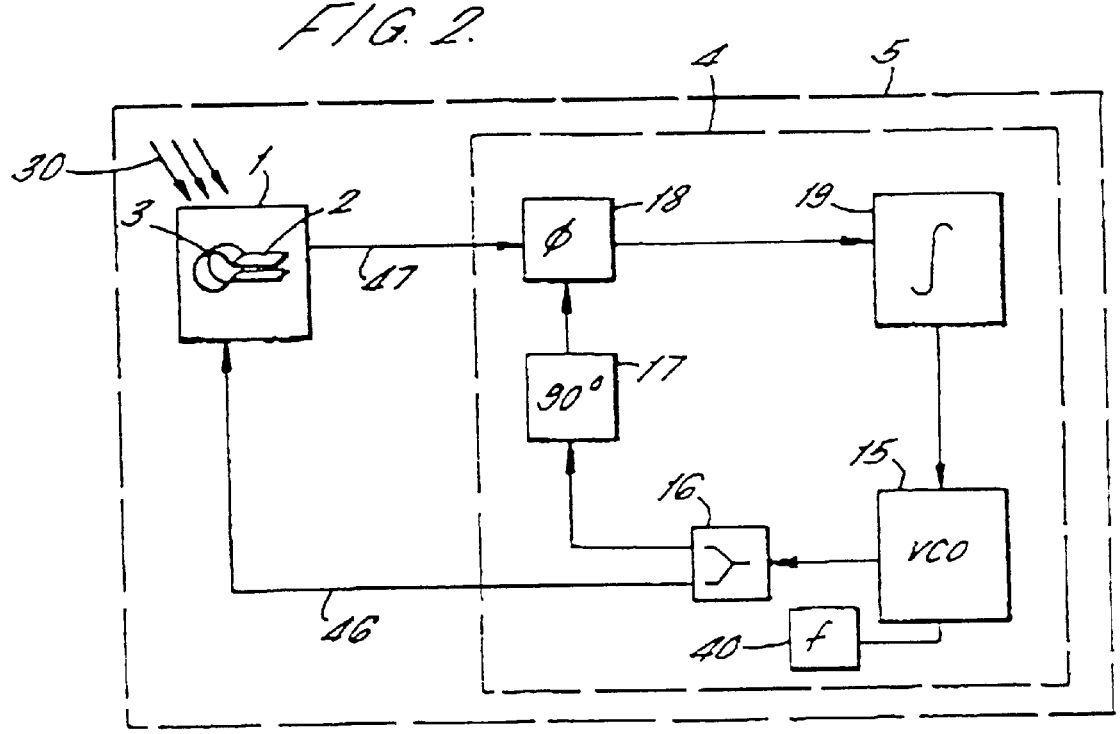
FIG. 2 is a block diagram of temperature monitoring apparatus incorporating the sensor of FIG. 1.

Referring now to FIG. 2, temperature monitoring apparatus 5 incorporates a temperature sensor 1 as illustrated in FIG. 1, and means 4 for measuring the resonant frequency of the resonant circuit of the sensor.

The apparatus may be made as a bolometer in which case the temperature of the capacitor 2 is dependent on the flux of incident radiation 30 on the sensor 1.

The resonant frequency measuring means 4 comprises a phase-locked loop (PLL) operable to track the changing resonant frequency of the temperature sensor 1.

The PLL comprises a voltage controlled oscillator 15, a power splitter 16, a 90° phase shifter 17, phase difference measuring means (PD) 18, and integrating means 19.

The voltage controlled oscillator (VCO) 15 generates a signal at a frequency f, where f is proportional to the input voltage provided to the VCO 15.

This signal is split into two branches by the power splitter 16, the first of which is transmitted to the phase difference measuring means (PD) 18 via the LC resonant circuit of the sensor 1, while the second is transmitted to the PD 18 via the 90° phase shifter 17.

The sensor 1 is connected to the power splitter 16 by a first transmission line section 46, and to the PD 18 by a second transmission line section 47. The feed to the first transmission line section 46 has a source impedance matched to the characteristic impedance of the line, typically 50 ohms. Similarly the second transmission line section 47 has an impedance matched termination at the PD 18.

Impedance matching of the transmission line section 46 is also ensured at the sensor 1. Especially if only a single sensor is connected to the lines, it may be possible to connect the line sections 46 and 47 directly together at the sensor with the resonant circuit of the sensor connected across the line sections. Then, so long as the PLL operates to keep the line frequency at the resonant frequency of the resonant circuit, the parallel resonant circuit has very high impedance and will not significantly load the transmission lines at the sensor connection.

Figure 3:
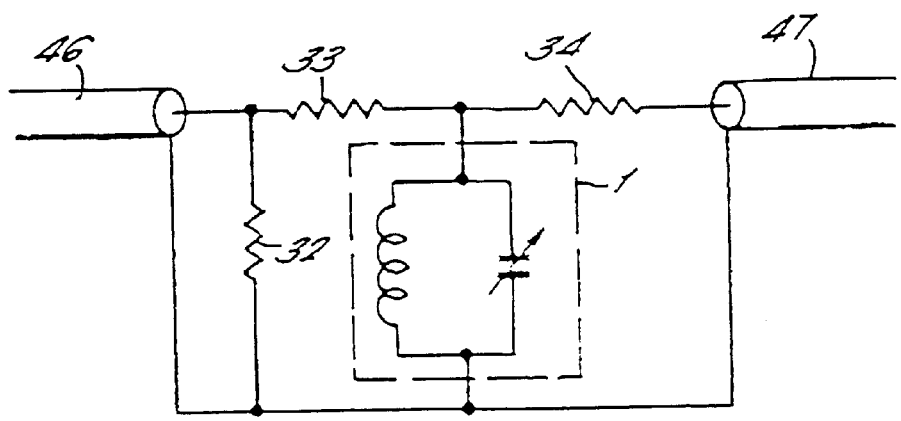
FIG. 3 is a circuit diagram illustrating how the sensor may be connected to the transmission lines in the apparatus of FIG. 2.

Conveniently, however the transmission line sections 46 and 47 are connected to the sensor 1 as shown in FIG. 3. A resistance 32 (typically 50 Ω) provides matching termination of the line section 46. A relatively higher value resistance 33 (typically 100 Ω+) feeds the RF voltage generated across resistance 32 to the resonant circuit of the sensor 1.

A further resistance 34 (typically 100 Ω+)feeds the voltage generated across the resonant circuit to the second line section 47. In this way, impedance matched termination of the transmission line section 46 is maintained at the sensor, even though the impedance of the parallel resonant circuit may fall to a very low value when off resonance.

Resistor 34 serves to decouple the resonant circuit from the second line section 47, which again has a typical impedance of 50 Ω.

The phases of the signals arriving at the PD 18 via the two branches are compared by the PD 18, which produces a corresponding output voltage which is communicated to the integrating means 19. This output voltage integrates to zero when the phase difference between the two signals is 90°.

The integrating means 19 integrates and amplifies the output voltage and provides the VCO 15 with an input voltage proportional to the integrated output voltage. Thus the integrated output voltage from the PD 18 is used to control the VCO 15.

If f does not equal the resonant frequency, $f_0$, the resonant circuit introduces a phase shift to the signal arriving at the PD 18 via the first branch, and the PD 18 produces an output voltage which results in a change in the input voltage provided to the VCO 15, causing f to move closer to $f_0$.

The integrating means 19 introduces sufficient gain into the loop to ensure that the output frequency f of VCO 15 closely follows the resonant frequency $f_0$, keeping the phase difference at PD 18 at a low value.

In this way, the PLL locks on to and tracks the resonant frequency of the LC resonant circuit.

In practice phase compensation, e.g. a delay line, may be included in the branch incorporating the phase shifter 17, and/or the branch directly to the resonant circuit 1, to compensate for the phase shift introduced by the length of the transmission lines 46 and 47.

Frequency indicating means 40 connected and responsive to the VCO 15, provide an indication of the frequency f at which signals are presently being generated, and by the operation of the PLL this frequency is equal to the present resonant frequency of the sensor 1. The read-out from the frequency indicating means 40 can therefore be used to determine the flux of radiation 30 incident on the sensor 1. The read-out can be compared to calibration data.

Alternatively, a signal providing an indication of the flux on the sensor can be derived from the input control voltage to VCO 15.

Figure 4:
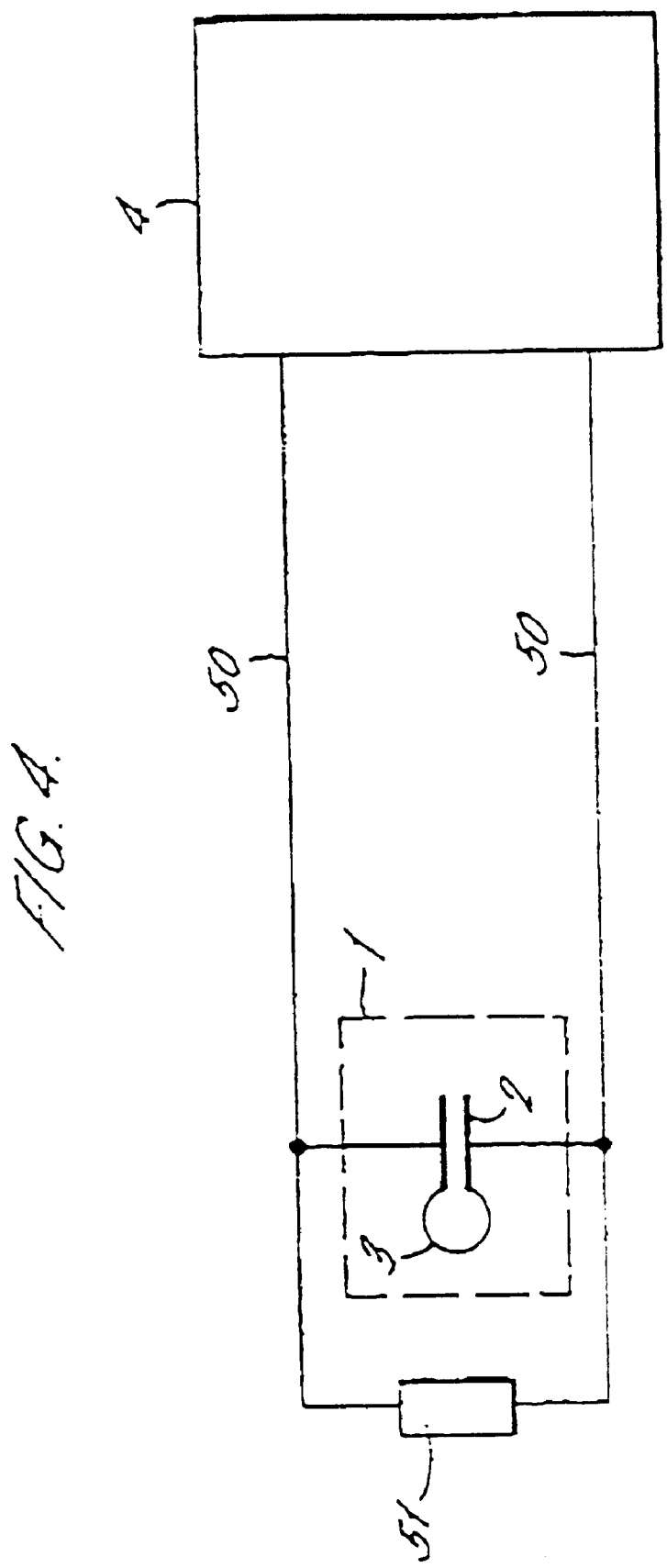
FIG. 4 is a schematic diagram of a further embodiment of temperature sensor in combination with resonant frequency measuring means.

Advantages of this embodiment are that:
1) the resonant frequency may be tracked, and a continuous read-out of its value provided;
2) the measurement of resonant frequency is insensitive to noise, and the bolometer may be used to measure radiation in noisy environments, such as those encountered in fusion research;
3) the cables connecting the resonant frequency measuring means to the sensor may be long, without preventing accurate measurement of resonant frequency;

Referring now to FIG. 4, in this embodiment, the temperature sensor 1 is connected to resonant frequency measuring means 4 by a single transmission line 50. The transmission line is terminated close to the sensor by a termination resistor 51 having a resistance equal to the characteristic impedance of the transmission line 50.

To signals at the resonant frequency, the sensor looks like a very high impedance having no reactive component, and the effective load seen connected across the transmission line 50 is simply the resistance of the termination resistor 51. Thus, the transmission line looks like an infinite line, and no reflected signals at the resonant frequency are produced. Away from resonance, reflected signals from the sensor can be detected at the measuring means 4 e.g. as a phase change across the source impedance of a VCO. A phase locked loop may then be used to lock the VCO to the resonant frequency keeping the phase change to a minimum.

An advantage of this embodiment is that the number of cables connecting the sensor 1 to the measuring means 4 is minimised.

Figure 5:
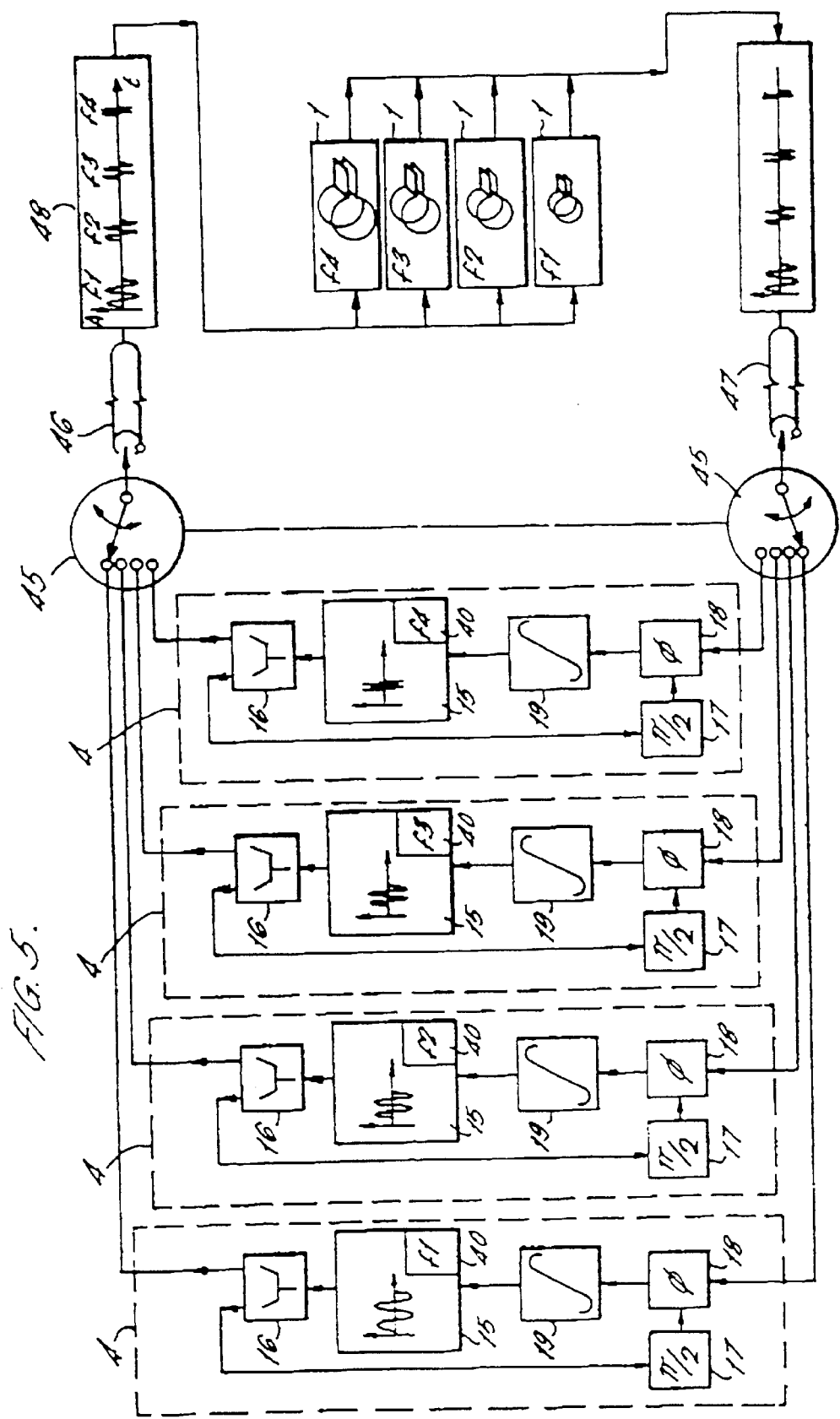
FIG. 5 is a block diagram of a multiple sensor system.

FIG. 5 shows a schematic of a multiple sensor system using four temperature sensors 1, four resonant frequency measuring means 4, two choppers 45, and first and second transmission lines 46, 47.

The temperature sensors 1 incorporate four different inductors 3 and the resonant frequencies, f1, f2, f3 and f4, of the sensors 1 are offset. To prevent the capacitances of the different parallel resonant circuits from appearing to be connected in parallel, the resonant circuits are connected to the transmission line section 46 by respective series connected input resistances and to the line section 47 by respective series connected output resistances.

Each resonant frequency measuring means 4 comprises a PLL, and the choppers 45 connect the PLLs to the transmission lines 46, 47 in turn. Pulses 48 of the signals generated by the four VCOs 15 are thus transmitted along the first transmission line 46 to the LC resonant circuits of the sensors 1. Signal pulses return to the PLLs along the second transmission line 47.

The PLLs are arranged so as to "coast" through times of no input signal, and each PLL is able to lock onto and track the resonant frequency of the respective sensor.

Alternatively, filtering means (not shown in the figure) may be provided in the return path from the sensors to each respective PD 18 to pass the frequency band only for the respective resonant circuit. This permits all frequencies to be fed to the sensors simultaneously so that time domain chopping is unnecessary.

In other embodiments with a plurality of temperature sensors 1, each temperature sensor 1 may be connected to the measuring means by a respective separate cable or cables.

Figure 6:
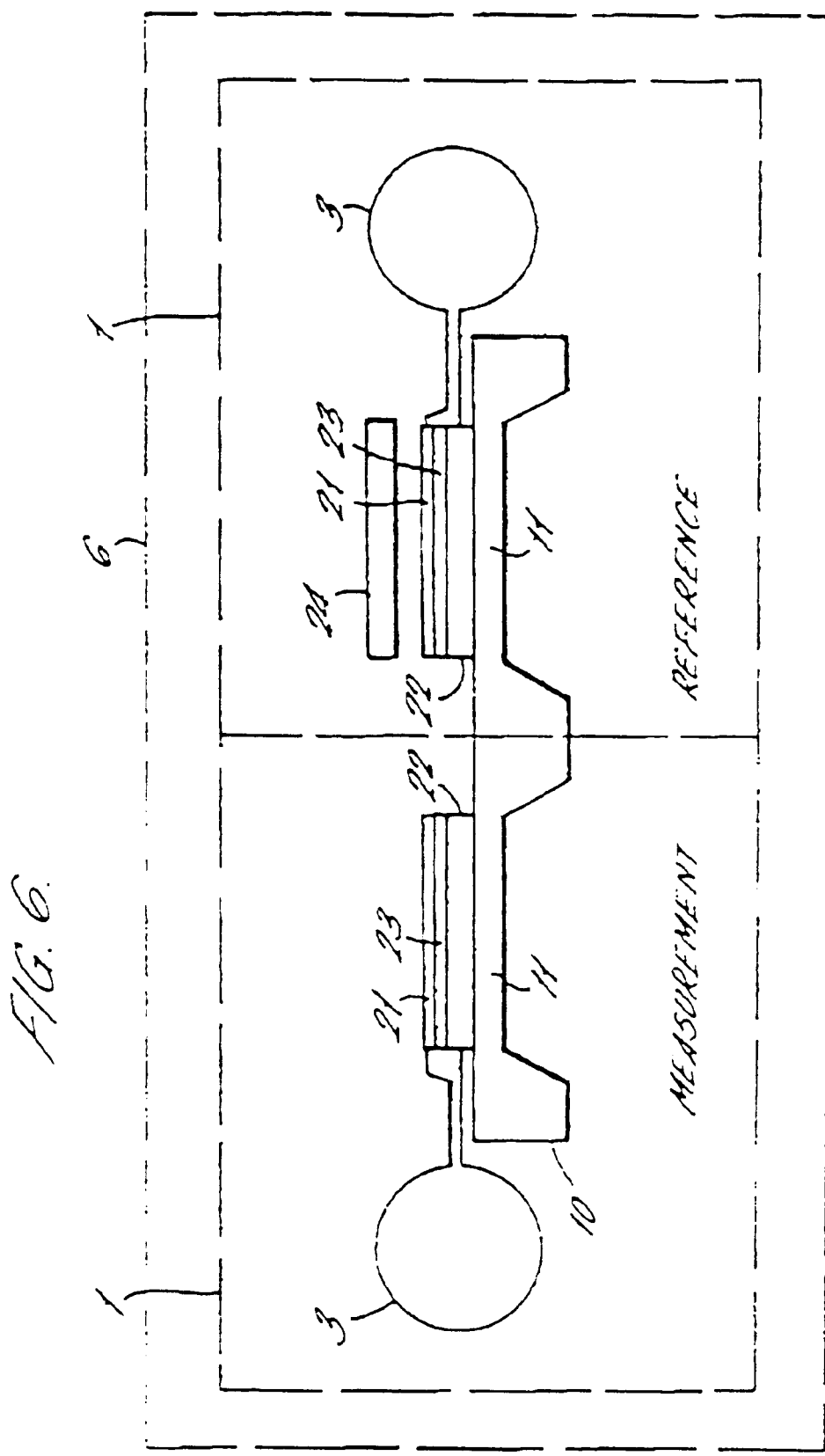
FIG. 6 is a schematic diagram of a bolometer sensor.

FIG. 6 shows an embodiment of bolometer sensor 6 for use in a bolometer for nuclear fusion research. The sensor incorporates two temperature sensors 1 as described with reference to FIG. 1. The two temperature sensors 1 have nominally the same electrical and thermal properties, each comprising thin film ferroelectric capacitors and single turn RF coils 3 bonded to the capacitor electrodes 21, 22. The capacitors are positioned over two adjacent windows 11 on the same substrate 10. A shield 24, formed from a material able to absorb the types of radiation that the sensor 6 is designed to measure, but not able to absorb neutrons or hard X-rays, is positioned over one of the capacitors, and is able to shield that capacitor from at least a fraction of incident radiation of the types that the sensor 6 is trying to measure, whilst still exposing the capacitor to neutrons and hard X-rays. The shielded temperature sensor 1 thus forms a reference sensor, and allows for the correction of temperature rises due to neutrons and hard X-rays, and is essential on all fusion bolometer systems. The shield may form part of the sensor housing which may have a window through the housing aligned with the unshielded capacitor.

The bolometer sensor 6 may be arranged such that the difference between the temperatures of the two capacitors 2 is proportional to the flux of incident radiation of the types the bolometer sensor 6 is designed to measure.

The bolometer sensor 6 may be combined with resonant frequency measuring means operable to measure the resonant frequencies of both temperature sensors 1, and may be incorporated in a bolometer.

It will be apparent that alternative embodiments may employ shields able to absorb other types of radiation, and the choice of material for the shield will be dependent on the application in which the bolometer sensor 6 is to be used.

Figure 7:
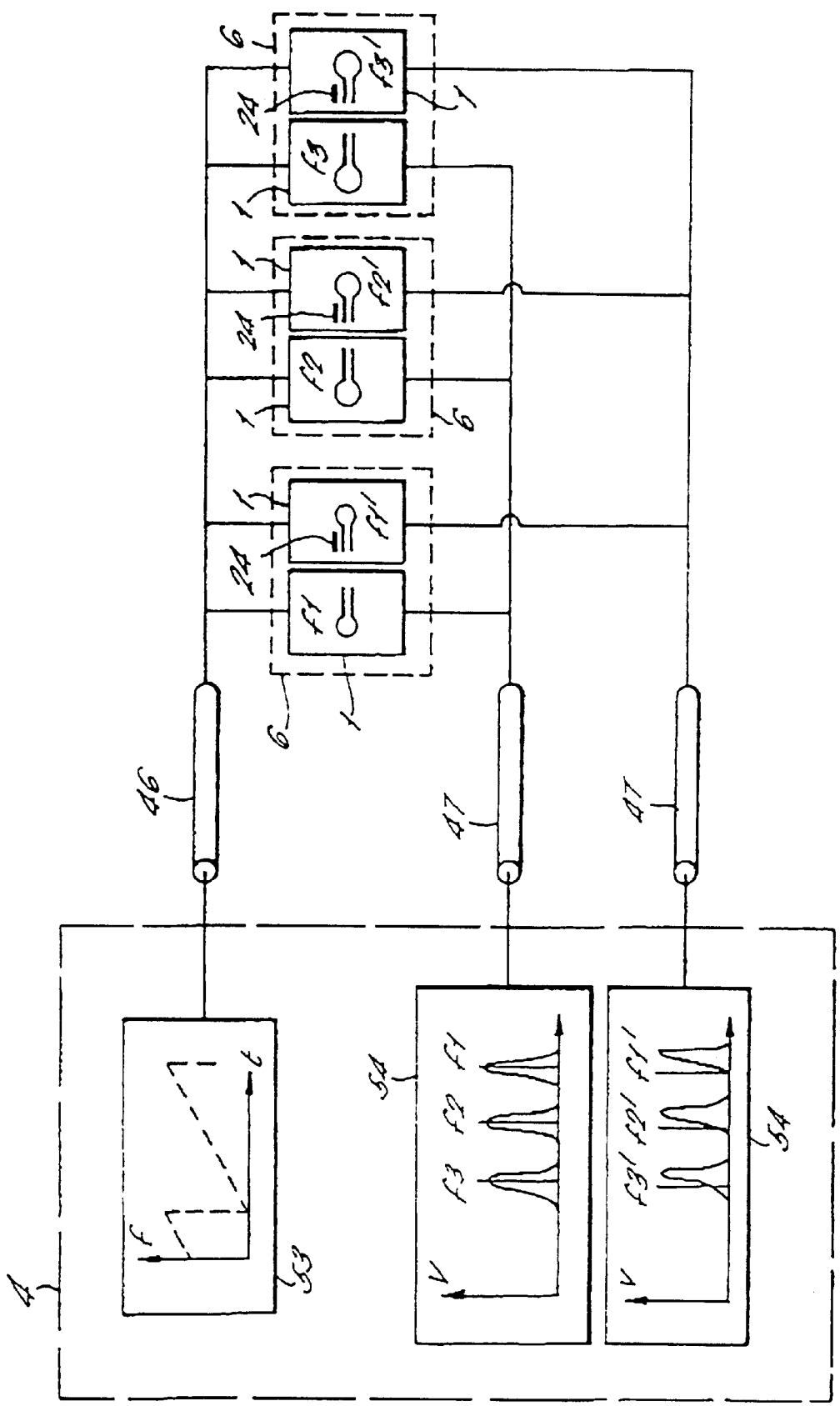
FIG. 7 is a block diagram of a multiple bolometer system.

Referring now to FIG. 7, a bolometer system comprises three bolometer sensors 6 connected to resonant frequency measuring means 4 by transmission lines 46, 47. The measuring means 4 comprises signal generating means 53, operable to generate signals at the resonant frequencies of the resonant circuits of the temperature sensors 1, and two spectrum analysers 54.

The coils 3 used in the three bolometer sensors 6 have different inductances and the resonant frequencies, i.e. f1, f2 and f3, are offset. In each bolometer sensor 6, the resonant frequencies (e.g. f1' and f1) of the reference and measurement temperature sensors 1 differ by an amount dependent on the flux of radiation incident on the bolometer sensor 6.

The frequency of the signal transmitted to the bolometer sensors 6 via the first transmission line 46 is ramped with time, and the spectrum analysers 54 provide an indication of the magnitude of the voltages developed across the resonant circuits as functions of this frequency.

Temperature differences, and hence radiation fluxes may be calculated from resonant frequencies, which correspond to the frequencies at which voltage maxima occur.

It will be apparent that in other embodiments, a large number of bolometer sensors 6 may be incorporated.

Figure 8:
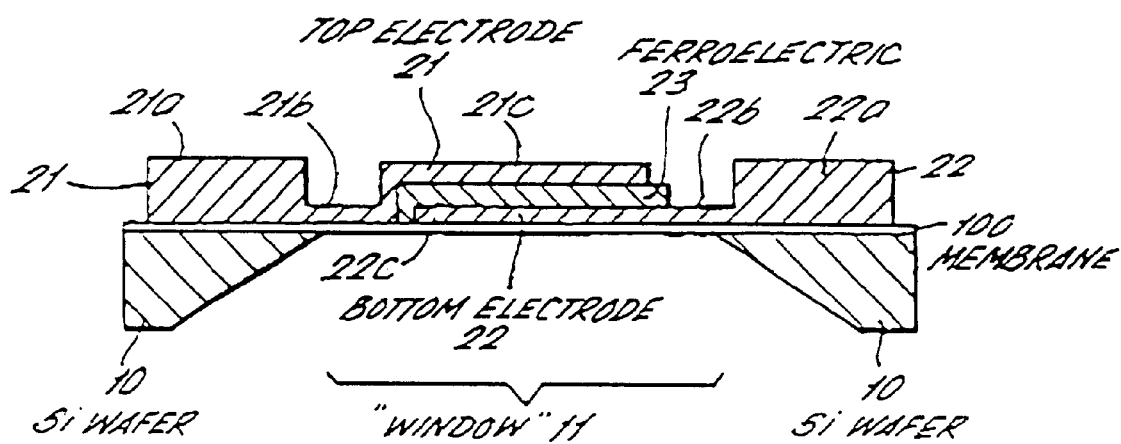
FIG. 8 is a schematic diagram of a capacitor suitable for use in embodiments of the present invention.

FIG. 8 shows a capacitor suitable for use in embodiments of the present invention and in other applications. This capacitor has been made using thin film technology and incorporates a ferroelectric layer 23 between two electrodes 21, 22 on a thin membrane 100 over a silicon wafer 10.

The membrane in this example is a thin layer of silicon nitride ($Si_3N_4$). The membrane 100 enables the silicon wafer 10 underneath the ferroelectric layer 23 to be completely etched away with acid without damaging the electrodes. In other examples the choice of material for the membrane depends on the substrate material and the "window" etching technique.

The membrane material is very strong and the thickness of the membrane may be less than 1 $\mu$m, for example 500 nm. By etching away the silicon completely in the window region 11 and by employing a very thin membrane, the thermal mass of the sensing portion of the capacitor can be reduced to improve its response.

The electrodes 21, 22 extend away from the ferroelectric layer 23 along the surface of the membrane 100, and thicken to define contacting regions 21a, 22a. These contacting regions 21a, 22a are separated from the portions of the electrodes in direct contact with the ferroelectric layer 23 by portions of reduced thickness 21b, 22b. In the figure these reduced thickness regions are shown to be the same thickness as the "plates" of the capacitor 21c, 22c in intimate contact with the ferroelectric layer, but in alternative embodiments may be thinner than the plates.

This arrangement facilitates electrical connection to the capacitor, and provides a relatively high thermal resistance between the electrical connections and the capacitor plates. This helps to thermally isolate the "sensing part" of the capacitor (i.e. the plates 21c, 22c and the ferroelectric layer 23) from any associated measurement circuitry.

Low resistance connections can be made to the capacitor (by attaching wires to the regions of increased thickness 21a, 22a) without having to bond directly to the "plates" 21c, 22c.

This feature provides advantages in all applications, as any contact resistance is equivalent to a resistance in series with the capacitor. By reducing contact resistance the behaviour of the capacitor is able to approach more closely that of an ideal capacitor.

When the capacitor of FIG. 8 is incorporated in embodiments of the present invention as the temperature-sensitive element of a resonant circuit, the electrode arrangement which enables lower resistance contacts to be made will in turn improve the quality factor Q of the resonant circuit. Lowering the contact resistance increases the Q factor, gives a sharper resonance and so improves the resolution of the temperature sensor.

Providing thicker contacting regions 21a, 22a away from the ferroelectric material 23 rather than contacting directly to the capacitor "plates" also provides a second advantage. As can be seen from FIG. 8 the "temperature sensing part" of the capacitor (ie the plates 21c, 22c and the ferroelectric layer 23) are attached to the rest of the capacitor only by thin links comprising the regions of reduced electrode thickness 21b, 22b and the membrane. These thin links help to thermally isolate the sensing part of the capacitor from the contact regions, and hence from any associated circuitry. The links inhibit the conduction of heat away from the ferroelectric layer and so can improve the response speed and accuracy of the capacitor as a temperature sensing element. For example, when the capacitor is incorporated in a bolometer as the temperature sensing element (whether in a resonant circuit or another arrangement) the heat-conduction-inhibiting links enable more accurate measurement of incident radiation, as any temperature rise over a measurement time interval will more accurately represent the total radiant energy incident on the capacitor plates over that interval.

Also, with this electrode arrangement, any heat conducted to the capacitor along connecting wires first reaches the thicker contacting regions 21a, 22a and then flows mainly into the silicon wafer rather than to the ferroelectric material 23. Thus the contacting regions 21a, 22a and the silicon substrate 10 act as a heatsink.

This is particularly advantageous when the capacitor is being used as the temperature sensitive element in a bolometer, whether it is incorporated in a resonant circuit or an alternative circuit, for example a bridge circuit for measuring its capacitance. By preventing heat from being conducted to the ferroelectric material from connecting wires, the above arrangement enables the capacitor to be used to resolve very small changes in the intensity of incident radiation.

The thermal characteristics of the "heatsink" can be set by choosing appropriate thicknesses for the substrate 10 and the connection regions 21a, 22a.

In fact, it will be apparent that the thermal characteristics of the entire capacitor may be set by choosing appropriate thicknesses for each of the component parts.

Underneath the ferroelectric region 23 the silicon wafer has been almost completely etched away. This produces a temperature sensing region with an extremely small thermal mass and enables very fast response times to be achieved. Finite element simulations have shown a time constant $\tau$ of less then 10 ms for some bolometer designs incorporating the capacitor, compared with 0.2s for typical known bolometers. The capacitor should in theory be able to resolve very low power levels (eg. 40 $\mu W/cm^2$, which is the noise level in one fusion research application) at a reasonable frequency (25 Hz).

Etching away the silicon underneath the ferroelectric material also helps prevent heat conducted to the capacitor from connecting leads from raising the temperature of the ferroelectric, and also inhibits the conduction of heat away from the ferroelectric layer and capacitor plates, as discussed previously.

The design of the electrodes and substrate thermally isolates the ferroelectric material from any associated circuitry.

An advantage of using ferroelectric material 23 between the capacitor plates is that the dielectric constant of a ferroelectric ceramic exhibits a strong temperature dependence. Also, ferroelectric ceramics having a wide range of chemical compositions can be used. By changing the composition, the electrical properties of the material (ie. its dielectric constant and Curie temperature) can be adjusted to the requirements of the technical application. They can be manufactured in thin film technology, are mechanically and chemically resistant, and can withstand high temperatures.

Of particular interest in fusion research are the radiation properties of ferroelectric ceramics. They are intrinsically radiation hard, especially when driven by a.c. currents, and radiation induced degradation can be recovered by annealing.

The capacitor of FIG. 8 is, therefore, particularly well suited for use as a temperature sensing element in environments where high levels of radiation are encountered.

Suitable materials for the electrodes 21, 22 are platinum (Pt) and gold (Au), and the ferroelectric 23 may be Lead-Lanthanum-Zirconium-Titanate (PLZT) (8/65/35). The properties of the ferroelectric can be varied by changing its chemical composition.

Other ferroelectric materials may be used, for example Lead-Zirconium (PZ) 50/50, PZT, and BST/60% Sr. PLZT, PZ and BST may be more suitable than PZT for fusion applications because of the high Curie temperature of PZT.

To summarise, the capacitor of FIG. 8 has very low thermal mass (enabling very fast response), has been designed to minimise thermal time constants (heat delay), thermally isolates the active temperature sensing part, enables good electrical connections to be made, and can be manufactured with good reproducibility.

Figure 9:
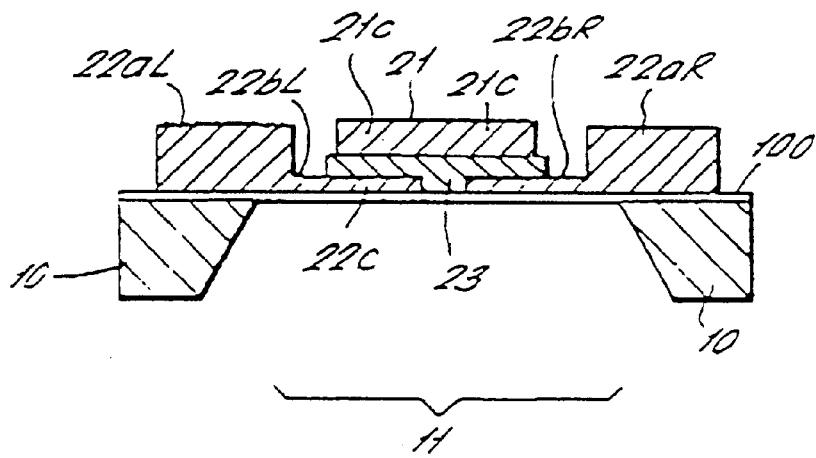
FIG. 9 is a schematic diagram of another capacitor suitable for use in embodiments of the present invention.

FIG. 9 shows a schematic cross section of another capacitor design suitable for use in embodiments of the present invention. It incorporates a symmetrical split bottom electrode 22 and a contactless central top electrode 21. The two pieces of the bottom electrode are not in direct electrical contact with each other. When the capacitor is connected in a circuit, separate contacts are made to the left and right-hand contact regions 22aL, 22aR and the capacitor is then equivalent to two capacitors in series. This design provides all of the advantages of the capacitor shown in FIG. 8, e.g. thermal isolation of the active temperature sensing part, ease of electrical contact, low resistance contacts etc., but in addition provides the advantage of improved ease of fabrication. In particular, the top electrode 21 in FIG. 9 is a simple layer, rather than the stepped top electrode 21 of the capacitor in FIG. 8. This simplified design means that the thickness of the top electrode can easily be increased during manufacture. This provides advantages for bolometer applications as a thicker electrode is able to stop and absorb higher energy photons. With the capacitor design of FIG. 8, the thickness of the top electrode can be increased, but at high temperatures stresses induced in the step region may be problematic. With the design of FIG. 9, these problems are avoided. The capacitor design in FIG. 9 also provides the advantage that the contactless top electrode is thermally isolated from the bottom electrodes (and hence from any associated circuitry) by the ferroelectric layer.

Although in the embodiments described, the resonant circuits were parallel LC resonant circuits, it will be apparent that in other embodiments the inductor and capacitor may be connected as a series resonant circuit. In particular, since series resonant circuits exhibit high impedance away from resonance, multiple series resonant arrangements may be connected to a single transmission line without one series arrangement interfering with the resonance of another, so long as the respective resonant frequencies of the arrangements are sufficiently spaced apart.

Embodiments incorporating single-turn coils have been described, but coils having a plurality of turns may of course be used. Other forms of inductive device may also be used.

Instead of the capacitor having a temperature-dependent reactance, the inductor may have a temperature-dependent reactance; for example it may comprise a coil having a ferromagnetic core. Then, when used in a bolometer sensor, one of the inductors is shielded instead of one of the capacitors. Ferromagnetic materials are however generally unsuitable in fusion research.

Embodiments incorporating ferroelectric capacitors have been described, but alternative types of capacitor having temperature-dependent reactances may be used. These alternative capacitors may include dielectrics whose dimensions change with temperature, thereby altering the separation of the capacitor's electrodes.

In fusion research applications it is desirable to arrange for the resonant circuits to have nominal resonant frequencies sufficiently far away from the frequencies employed in the RF heating devices used to heat the plasma, in order to reduce noise. In one application, typical heating device frequencies are in the region of 20MHz, and suitable resonant frequencies are in the region of 10MHz. In other applications, alternative resonant frequencies may be appropriate.

What is claimed is:

1. Sensing apparatus comprising:
a temperature sensor comprising an inductor and a capacitor connected as a resonant circuit, wherein at least one of said capacitor and said inductor has a temperature dependent reactance, whereby the resonant frequency of said resonant circuit is dependent on the temperature of at least one of said inductor and said capacitor;
means for measuring the resonant frequency of said resonant circuit,
wherein said measuring means includes signal generating means responsive to said resonant circuit to generate a signal at the resonant frequency thereof and indicating means to provide an indication of the frequency of the signal generated by said signal generating means, and said measuring means in combination with said resonant circuit comprises a phase-locked loop (PLL) operable to track said resonant frequency, and
a transmission line connecting said sensor to said measuring means, and an impedance matching termination resistance across said transmission line.

2. Sensing apparatus in accordance with claim 1, wherein said sensor is connected to said transmission line at a point remote from said termination resistance.

3. Sensing apparatus in accordance with claim 2, wherein the transmission line comprises a first line section extending from said measuring means to said sensor and a second line section extending from said sensor back to terminate at said measuring means.

4. Sensing apparatus in accordance with claim 3 and including resistances at said sensor to provide impedance matched termination of said first line section.

5. Sensing apparatus in accordance with claim 1, wherein the inductor of the or each temperature sensor is a conducting loop.

6. Sensing apparatus comprising:

a temperature sensor comprising an inductor and a capacitor connected as a resonant circuit, wherein at least one of said capacitor and said inductor has a temperature-dependent reactance, whereby the resonant frequency of said resonant circuit is dependent on the temperature of at least one of said inductor and said capacitor;

means for measuring the resonant frequency of said resonant circuit, wherein said measuring means includes signal generating means operable to generate a signal at a frequency lying within a frequency range and to scan said frequency across said range, said range including said resonant frequency, and a transmission line connecting said sensor to said measuring means, and an impedance matching termination resistance across said transmission line.

7. Sensing apparatus including:

a plurality of temperature sensors, each temperature sensor comprising an inductor and a capacitor connected as a resonant circuit, wherein at least one of said capacitor and said inductor has a temperature-dependent reactance, whereby the resonant frequency of said resonant circuit is dependent on the temperature of at least one of said inductor and said capacitor, each temperature sensor providing a respective different range of resonant frequencies;

means for measuring the resonant frequency of the resonant circuit of each of said sensors; and a common transmission line, said sensors being connected to said measuring means by said common transmission line.

8. Sensing apparatus in accordance with claim 7, wherein the capacitor of the or each temperature sensor has a temperature-dependent reactance.

9. Sensing apparatus in accordance with claim 8, wherein the capacitor has a dielectric having a temperature-dependent permittivity.

10. Sensing apparatus in accordance with claim 9, wherein the capacitor is a ferroelectric capacitor.

11. Sensing apparatus in accordance with claim 10, wherein the capacitor is formed by integrated circuit techniques on a substrate.

12. Sensing apparatus in accordance with claim 11, wherein said substrate has a region of reduced thickness, the capacitor being located on said region.

13. A bolometer comprising the sensing apparatus of claim 11, wherein the temperature dependent inductor or capacitor of the or each temperature sensor is arranged to have a temperature dependent on the flux of a predetermined type of radiation incident on the sensor.

14. A bolometer according to claim 13, and including two said temperature sensors and a shield arranged to shield the temperature dependent part of one of said sensors from at least a proportion of incident radiation of the predetermined type.

15. A bolometer according to claim 14, wherein the capacitors of said two sensors are formed on a common substrate and said shield is arranged to shield the capacitor of the shielded sensor.

16. A bolometer according to claim 14, wherein said measuring means is arranged to measure the resonant frequency of the resonant circuit of each of the temperature sensors.

17. A bolometer comprising the sensing apparatus of claim 8, wherein the respective temperature dependent inductor or capacitor of each of said plurality of temperature sensors is arranged to have a temperature dependent on the flux of a predetermined type of radiation incident thereon.

* * * * *